United States Patent
Sarraf et al.

(10) Patent No.: US 9,436,854 B2
(45) Date of Patent: Sep. 6, 2016

(54) CONNECTOR MODULE

(71) Applicant: Tyco Electronics Corporation, Berwyn, PA (US)

(72) Inventors: David Bruce Sarraf, Elizabethtown, PA (US); Charles Malstrom, Lebanon, PA (US); Mike Laub, Enola, PA (US); Craig M. Campbell, Mechanicsburg, PA (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 0 days.

(21) Appl. No.: 14/494,680

(22) Filed: Sep. 24, 2014

(65) Prior Publication Data

US 2016/0086000 A1 Mar. 24, 2016

(51) Int. Cl.
| | | |
|---|---|---|
| *G06K 7/00* | (2006.01) | |
| *H01R 13/504* | (2006.01) | |
| *H01R 12/71* | (2011.01) | |
| *H01R 12/72* | (2011.01) | |
| *H01R 13/506* | (2006.01) | |
| *H01R 13/03* | (2006.01) | |
| *H01R 13/24* | (2006.01) | |

(52) U.S. Cl.
CPC ............. *G06K 7/0056* (2013.01); *G06K 7/003* (2013.01); *G06K 7/0021* (2013.01); *H01R 12/714* (2013.01); *H01R 12/721* (2013.01); *H01R 13/504* (2013.01); *H01R 13/506* (2013.01); *H01R 13/035* (2013.01); *H01R 13/2442* (2013.01)

(58) Field of Classification Search
CPC .. G06K 7/0056; G06K 7/003; G06K 7/0039; H01R 12/71; H01R 27/00; H01R 13/504
USPC ................................... 439/607.22
See application file for complete search history.

(56) References Cited

U.S. PATENT DOCUMENTS

| | | | | |
|---|---|---|---|---|
| 4,831,723 A * | 5/1989 | Kaufman | .......... | H01L 23/49562 228/123.1 |
| 6,239,687 B1 * | 5/2001 | Shrier | ..................... | H01C 7/105 338/20 |
| 7,938,656 B2 * | 5/2011 | Hu | ........................ | G06K 7/0021 439/159 |
| 7,967,632 B2 * | 6/2011 | Kiryu | ................... | G06K 7/0021 439/541.5 |
| 8,308,514 B1 * | 11/2012 | Su | ................................. | 439/630 |
| 8,376,764 B1 * | 2/2013 | Su | ....................... | G06K 13/0831 439/157 |
| 8,579,640 B2 * | 11/2013 | Ho | ..................... | H01R 13/6271 439/159 |
| 8,740,635 B2 * | 6/2014 | Lim | ..................... | G06K 13/008 439/159 |
| 9,048,594 B2 * | 6/2015 | Lim | ........................ | H01R 27/00 |
| 2010/0184310 A1 | 7/2010 | Tochi et al. | | |
| 2012/0108110 A1 | 5/2012 | Li | | |
| 2014/0113495 A1 * | 4/2014 | Lim | ........................ | H01R 27/00 439/630 |

FOREIGN PATENT DOCUMENTS

WO 2011/150307 A2 12/2011

OTHER PUBLICATIONS

European Search Report, Mail Date, Feb. 26, 2016, EP 15 18 6545, Application No. 15186545.8-1801.

* cited by examiner

*Primary Examiner* — Jean F Duverne (57) ABSTRACT

A connector module includes a housing and a conductive lead frame. The housing includes a cover and a base that define a cavity therebetween. The cavity receives a circuit card therein. The base has a top side and a bottom side. The top side faces the cover and defines part of the cavity. Multiple windows extend through the base between the top and bottom sides. The base includes a conductive layer at least partially covered by a non-conductive layer. The conductive lead frame is coupled to the bottom side of the base. The lead frame includes multiple contact beams that extend into the cavity through the windows of the base. The lead frame is electrically isolated from the conductive layer of the base by the non-conductive layer of the base. The lead frame further includes mounting contacts configured to be mounted to conductive components of a circuit board.

20 Claims, 5 Drawing Sheets

CONNECTOR MODULE

BACKGROUND OF THE INVENTION

The subject matter herein relates generally to connector modules for electrical connectors.

Some electrical systems utilize a connector module, such as a receptacle or header connector, to interconnect a circuit board and at least one pluggable circuit card. The connector module is mounted to the circuit board. The connector module includes a housing that holds electrical terminals or contacts. The electrical terminals are conductive and configured to engage contact pads of the circuit card at one end and terminate to conductive elements of the circuit board at another end to provide signal pathways between the circuit card and circuit board. The housing guides the circuit card into engagement with the electrical terminals and retains the electrical connection between the circuit card and the electrical terminals.

In typical connector modules, at least part of the housing is conductive. Since the housing holds the electrical terminals, if the electrical terminals make contact with a conductive portion of the housing, a short circuit may be created which negatively affects the performance of the connector module and could potentially damage the connector module, the circuit card, and/or the circuit board. To prevent the electrical terminals from contacting conductive portions of the housing, the electrical terminals in some known connector modules are overmolded in a non-conductive overmold material. The overmold material electrically isolates the electrical terminals within the overmold material from the conductive portions of the housing. However, there are recognized problems associated with overmolding electrical terminals, especially when the connector module is designed to be compatible with small scale circuit cards, such as subscriber identification module (SIM) cards.

For example, during the overmolding process, the electrical terminals are placed in an insert mold and plastic or another overmold material is injected into the insert mold through flow passages. However, for small scale electrical terminals, the diameters of the flow passages may be so small that the plastic does not flow readily therethrough. Thus, the process may have to be run at a higher pressure or at higher temperatures than are desired in order to lower the viscosity of the plastic. As a result of such modifications, the plastic may be prone to degradation, shrinkage, and the like, which can impair the integrity of the finished product. In addition, the electrical terminals may be overmolded as a lead frame in which the electrical terminals are coupled to each other. After overmolding, the electrical terminals need to be mechanically separated from each other to electrically isolate the individual electrical terminals. It may be difficult to separate the electrical terminals from each other when the connections that link the electrical terminals are covered by the overmold material. A need remains for a connector module that electrically isolates conductive portions of the housing from the electrical terminals without overmolding the electrical terminals.

BRIEF DESCRIPTION OF THE INVENTION

In one embodiment, a connector module is provided that includes a housing and a conductive lead frame. The housing includes a cover and a base. The cover is coupled to the base to define a cavity therebetween. The cavity is configured to receive a circuit card therein. The base has a top side and a bottom side. The top side faces the cover and defines part of the cavity. The base defines multiple windows that extend through the base between the top and bottom sides. The base includes a conductive layer that is at least partially covered by a non-conductive layer. The conductive lead frame is coupled to the bottom side of the base. The lead frame includes multiple contact beams that extend into the cavity through the windows of the base. The lead frame is electrically isolated from the conductive layer of the base by the non-conductive layer of the base. The lead frame further includes multiple mounting contacts configured to be mounted to conductive components of a circuit board.

In another embodiment, a connector module is provided that includes a housing and a conductive lead frame. The housing includes a base that defines a slot. The slot is configured to receive a circuit card therein. The base has a top side and a bottom side. The top side defines at least part of the slot. The base has multiple windows that extend through the base between the top and bottom sides. The base includes a metal layer that is at least partially covered by a powder coating layer. The conductive lead frame is coupled to the bottom side of the base. The lead frame includes multiple contact beams that extend through the windows of the base into the slot. The lead frame is electrically isolated from the metal layer of the base by the powder coating layer of the base. The lead frame further includes multiple mounting contacts configured to be mounted to conductive components of a circuit board.

In yet another embodiment, a connector module is provided that includes a housing and a conductive lead frame. The housing includes a base that defines a slot. The slot is configured to receive a circuit card therein. The base has a top side and a bottom side. The top side defines at least part of the slot. The base has multiple windows that extend through the base between the top and bottom sides. The base includes a conductive metal layer. The base further includes a non-conductive adhesive layer disposed on the bottom side of the base. The adhesive layer is arranged in a web that extends around at least some of the windows of the base without covering the windows. The conductive lead frame is secured to the adhesive layer such that the adhesive layer is between the metal layer of the base and the lead frame. The lead frame includes multiple contact beams that extend through the windows of the base into the slot. The lead frame is electrically isolated from the metal layer of the base by the non-conductive material of the adhesive layer. The lead frame further includes multiple mounting contacts configured to be mounted to conductive components of a circuit board.

DETAILED DESCRIPTION OF THE INVENTION

Figure 1:
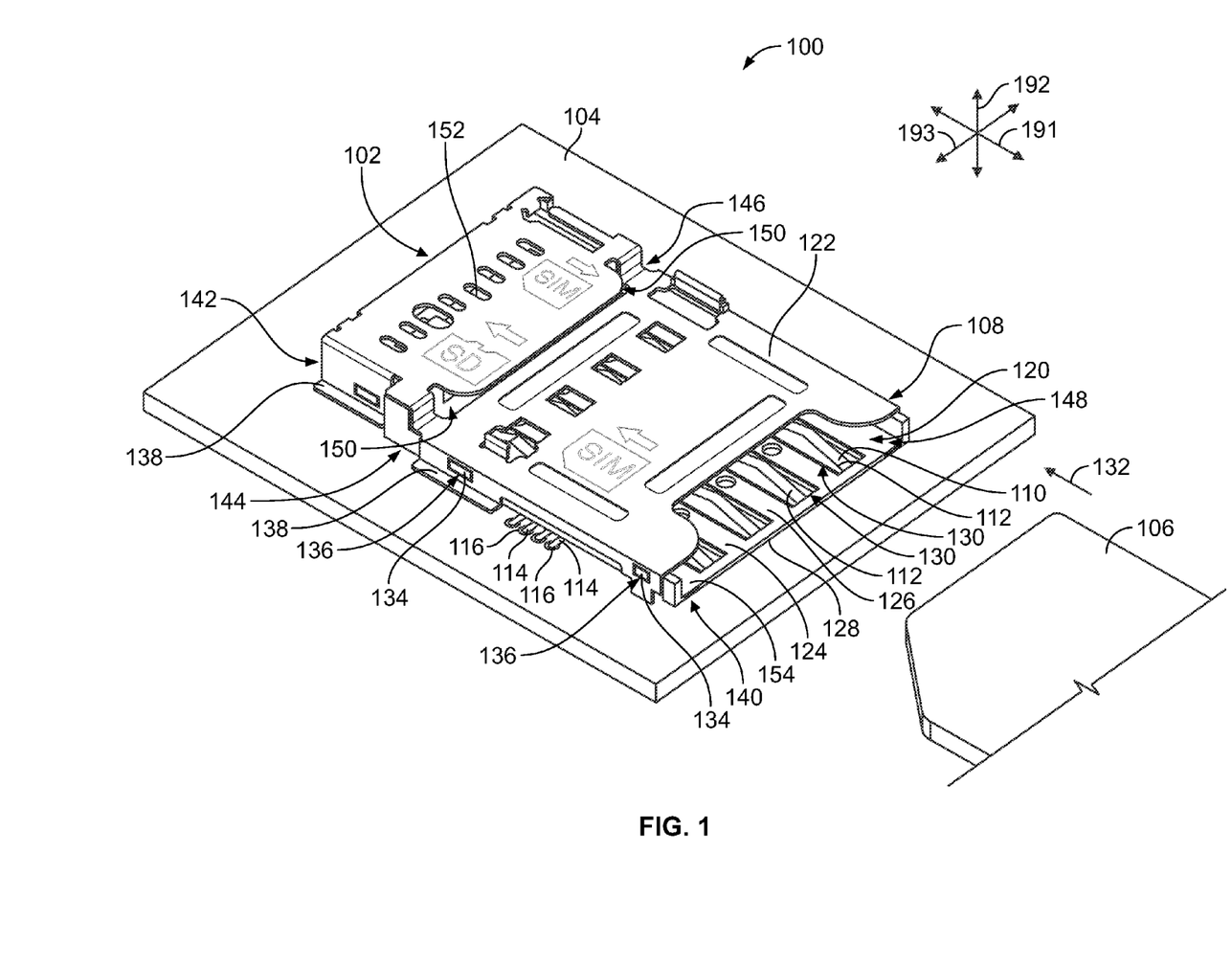
FIG. 1 is a perspective view of an electrical system in accordance with an exemplary embodiment.

FIG. 1 is a perspective view of an electrical system 100 in accordance with an exemplary embodiment. The electrical system 100 includes a connector module 102 that is mounted on a circuit board 104. The electrical system 100 further includes an electrical connector 106 that is configured to mate with the connector module 102. The electrical connector 106 is an electrical circuit card in the illustrated embodiment, and is referred to herein as circuit card 106. In other embodiments, however, the electrical connector 106 may be a cable-ended connector or another type of connector other than a circuit card. The connector module 102 provides an electrical connection between the circuit card 106 and the circuit board 104. For example, signals are transmitted between the circuit card 106 and the circuit board 104 through the connector module 102. The electrical system 100 is oriented with respect to a longitudinal axis 191, an elevation axis 192, and a lateral axis 193. The axes 191-193 are mutually perpendicular. Although the elevation axis 192 appears to extend in a vertical direction parallel to gravity in FIG. 1, it is understood that the axes 191-193 are not required to have any particular orientation with respect to gravity.

The connector module 102 includes a housing 108 and a lead frame 110. The lead frame 110 is conductive. The lead frame 110 includes multiple contact beams 112 and mounting contacts 114. The contact beams 112 are configured to engage conductive elements (not shown), such as contact pads, on the circuit card 106 when the circuit card 106 is mated to the connector module 102. The mounting contacts 114 are mounted to conductive components 116 of the circuit board 104. The conductive components 116 may be vias, solder pads, or the like. The circuit board 104 may have conductive signal traces (not shown) that extend from the conductive components 116.

The housing 108 of the connector module 102 has a front end 140, a rear end 142, a left side 144, and a right side 146. The housing 108 defines a cavity 120 that is configured to receive the circuit card 106 therein. The cavity 120 extends inward from an opening 148 at the front end 140 of the housing 108. The circuit card 106 is configured to be loaded in a loading direction 132 through the opening 148 and into the cavity 120. The loading direction 132 may be along the longitudinal axis 191. In an embodiment, the housing 108 includes a cover 122 and a base 124. The cover 122 is coupled to the base 124 to define the cavity 120. The cavity 120 may be defined between the base 124 and the cover 122. The cover 122 and the base 124 guide the circuit card 106 into the cavity 120 so the circuit card 106 properly aligns with the contact beams 112 of the lead frame 110. The cover 122 may be a distinct part from the base 124, such that the cover 122 is coupled to the base 124 during an assembly process. The cover 122 and the base 124 may have compatible latching features. As shown in FIG. 1, the base 124 has projections 134 that are received in corresponding apertures 136 of the cover 122 to secure the cover 122 to the base 124. The housing 108 may be mounted to the circuit board 104. The cover 122 and/or the base 124 may include one or more mounting lugs that are configured to be secured to the circuit board 104, such as through soldering, mechanical fasteners, friction fits, and/or the like. In the illustrated embodiment, the cover 122 includes multiple mounting lugs 138.

The cover 122 is disposed above the base 124 along the elevation axis 192. The base 124 has a top side 126 and a bottom side 128. The top side 126 faces the cover 122 and defines part of the cavity 120 (for example, the cover 122 defines another part of the cavity 120). The base 124 defines multiple windows 130 that extend through the base 124 between the top and bottom sides 126, 128 of the base 124. As used herein, relative or spatial terms such as "top," "bottom," "above," "below," "left," "right," "front," and "rear" are only used to distinguish the referenced elements and do not necessarily require particular positions or orientations in the electrical system 100 or in the surrounding environment of the electrical system 100.

In an embodiment, the lead frame 110 is coupled to the bottom side 128 of the base 124. The contact beams 112 of the lead frame 110 are bent or formed out of plane with other parts of the lead frame 110. The contact beams 112 extend into the cavity 120 of the housing 108 through corresponding windows 130 of the base 124. The contact beams 112 may be spring-biased and deflectable. For example, as the circuit card 106 moves in a loading direction 132 and is received in the cavity 120, the circuit card 106 may engage the contact beams 112, causing the contact beams 112 to at least partially deflect downwards towards the base 124. The contact beams 112 are spring-biased so the contact beams 112 exert a reaction force against the circuit card 106 which retains engagement between the contact beams 112 and the circuit card 106.

In an embodiment, the circuit card 106 is a subscriber identification module (SIM) card. The electrical system 100 may be part of or related to a mobile telephony device. The SIM card may store information related to a mobile service provider, including subscriber information, authentication information, service information, network information, passwords, and the like. In the illustrated embodiment, the connector module 102 is configured to receive the circuit card 106 and is also configured to receive a second electrical connector (not shown). For example, the housing 108 of the connector module 102 may be a mezzanine housing that includes two different sets of conductors and two different cavities. In addition to the cavity 120 (for example, the "first" cavity 120) that is configured to receive the circuit card 106, the housing 108 optionally may define a second cavity 150 that is configured to receive the second electrical connector. The second cavity 150 may be disposed above the first cavity 120. The second electrical connector is received in the second cavity 150 and electrically connects to contacts 152 held within the second cavity 150. For example, the second electrical connector may be a Secure Digital (SD) memory card that stores music, photographs, and other files. Therefore, in an embodiment, the connector module 102 may be configured to provide separate electrical connections between a SIM card and the circuit board 104 and between an SD card and the circuit board 104. In other embodiments, the circuit card 106 and the second electrical connector may be connectors other than a SIM card and an SD card, respectively.

In one or more embodiments described herein, the base 124 of the connector module 102 includes a conductive layer 154. As described above, the lead frame 110 is also conductive, and is coupled to the bottom side 128 of the base 124. If the lead frame 110 contacts the conductive layer 154 of the base 124, an electrical short may result that allows electrical current traveling along the lead frame 110 to divert along the base 124. The short circuit disrupts signal transmission through the connector module 102 which reduces performance efficiency. The short circuit may also cause circuit damage, overheating, or even fire, requiring replacement or at least repair of components of the electrical system 100. In one or more embodiments herein, the base 124 further includes a non-conductive layer 164 (shown in FIG. 2). The non-conductive layer 164 at least partially covers the conductive layer 154. The lead frame 110 engages the non-conductive layer 164 when the lead frame 110 is coupled to the base 124 and does not contact the conductive layer 154. In an exemplary embodiment, the lead frame 110 is electrically isolated from the conductive layer 154 of the base 124 by the non-conductive layer 164 of the base 124. As a result, the connector module 102 avoids creating short circuits between the conductive layer 154 of the base 124 and the lead frame 110, avoiding damage and other issues accompanying unintentional short circuits.

Figure 2:
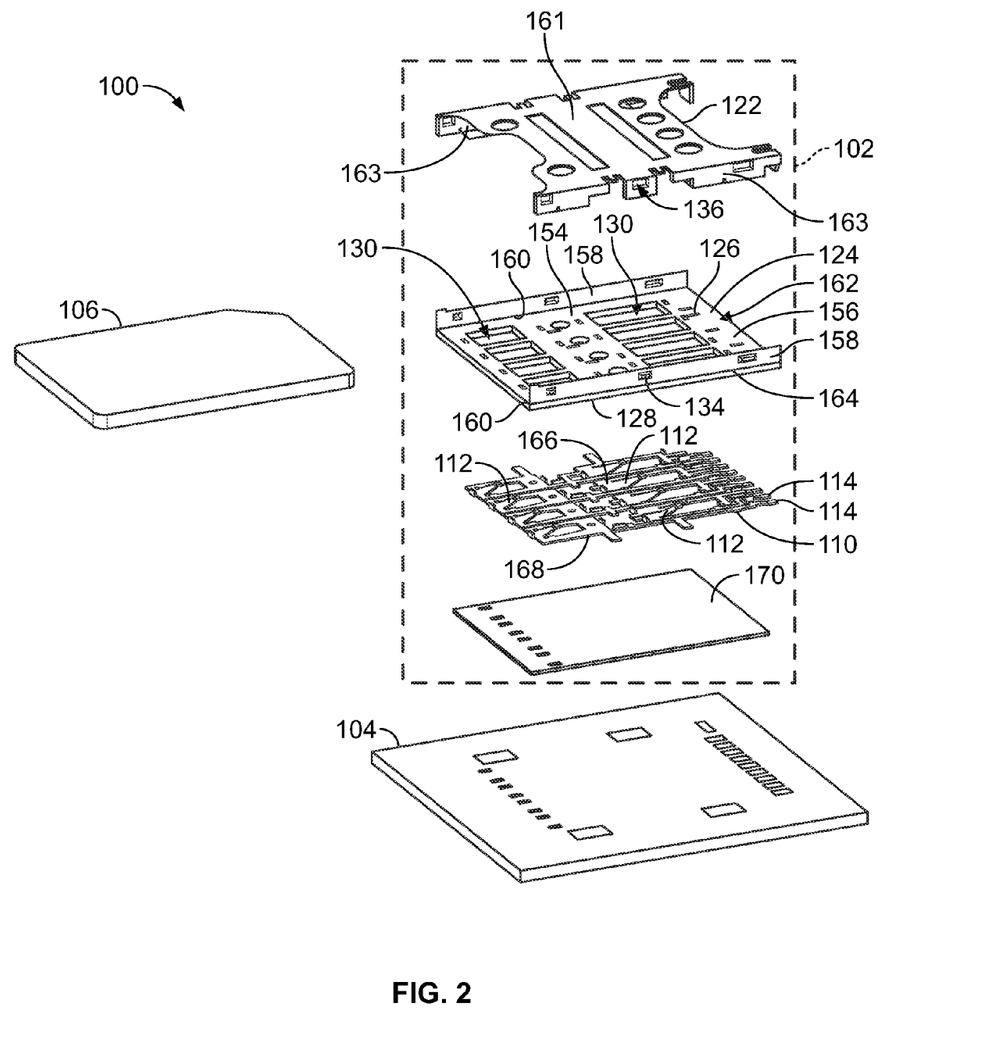
FIG. 2 is a perspective view of the electrical system showing an exploded connector module according to an embodiment.

FIG. 2 is a perspective view of the electrical system 100 showing an exploded connector module 102 according to an embodiment. The base 124 includes a floor 156 and two side walls 158. The side walls 158 extend upward from the floor 156 along the elevation axis 192 (shown in FIG. 1). A top side of the floor 156 defines the top side 126 of the base 124, and a bottom side of the floor 156 defines the bottom side 128 of the base 124. The side walls 158 extend from the top side 126 along edges 160 of the base 124. The base 124 defines a slot 162. The slot 162 is configured to receive the circuit card 106 therein. The slot 162 may be the part of the cavity 120 (shown in FIG. 1) defined by the base 124. The slot 162 extends above the top side 126 between the side walls 158. In an embodiment, the conductive layer 154 of the base 124 includes one or more metals. The conductive layer 154 may be referred to herein as a conductive metal layer 154 or metal layer 154. The conductive metal layer 154 may be produced by stamping and forming sheet metal.

The cover 122 of the connector module 102 includes a ceiling 161 and side walls 163 that extend downward from the ceiling 161 along the elevation axis 192 (shown in FIG. 1). The side walls 163 of the cover 122 are configured to engage the side walls 158 of the base 124 to couple the cover 122 to the base 124. For example, the side walls 163 of the cover 122 may define the apertures 136, and the side walls 158 of the base 124 may define the projections 134 that are configured to be received in the apertures 136. Like the conductive layer 154 of the base 124, the cover 122 may also be composed of one or more conductive metals. The cover 122 also may be formed by stamping and forming a sheet of metal. The conductive layer 154 of the base 124 may be configured to engage the cover 122 to electrically connect and/or common the conductive layer 154 and the cover 122. Electrically connecting the cover 122 and the base 124 may provide better electrical shielding and/or grounding for the connector module 102.

In an exemplary embodiment, the conductive metal layer 154 of the base 124 is at least partially covered by a non-conductive layer 164. The non-conductive layer 164 includes one or more plastics or other polymers. The non-conductive layer 164 has a high resistivity to the flow of electrical current through or along the layer 164. In the illustrated embodiment, the non-conductive layer 164 covers the conductive layer 154 along the bottom side 128 of the base 124. The non-conductive layer 164 engages the lead frame 110 below the bottom side 128 and provides electrical isolation between the conductive layer 154 of the base 124 and the lead frame 110. Optionally, the non-conductive layer 164 does not cover the conductive layer 154 along the top side 126 or along the side walls 158 of the base 124. Since the side walls 158 are not covered by the non-conductive layer 164, the conductive layer 154 of the base 124 engages and electrically connects to the cover 122. In other embodiments, however, the non-conductive layer 164 may cover the conductive layer 154 along at least part of the side walls 158 and/or the top side 126 of the base 124. For example, the non-conductive layer 164 in an alternative embodiment may cover an entirety of the conductive layer 154 of the base 124.

The conductive lead frame 110 is composed of at least one conductive metal. The lead frame 110 may be formed by stamping and then forming a sheet of metal. Since the lead frame 110 is electrically isolated from the conductive layer 154 of the base 124 by the non-conductive layer 164, the lead frame 110 does not include an overmold layer. Thus, the connector module 102 differs from some known connectors that overmold the conductive lead frame in a non-conductive material to provide electrical isolation between the lead frame and conductive portions of the housing. The lead frame 110 has a top side 166 and a bottom side 168. The top side 166 of the lead frame 110 engages the non-conductive layer 164 along the bottom side 128 of the base 124.

The connector module 102 may further include an insulation pad 170 disposed below the lead frame 110. For example, the insulation pad 170 may be located between the lead frame 110 and the circuit board 104. During assembly of the connector module 102, the insulation pad 170 may engage the bottom side 168 of the lead frame 110. The insulation pad 170 may be composed of a non-conductive material, such that the insulation pad 170 electrically isolates the conductive lead frame 110 from the surface of the circuit board 104, which may include exposed conductive components 116 (shown in FIG. 1). The mounting contacts 114 of the lead frame 110 may extend through or around the insulation pad 170 to engage the conductive components 116. The insulation pad 170 is configured to block unintended electrical current flow between the lead frame 110 and the circuit board 104.

In an embodiment, the connector module 102 may be assembled by first stamping and forming the cover 122, the conductive layer 154 of the base 124, and the lead frame 110 into the respective shapes. Then, the non-conductive layer 164 of the base is applied to at least part of the conductive layer 154. Next, the lead frame is aligned under the base 124 such that the contact beams 112 extend through corresponding windows 130 of the base 124. The lead frame 110 is then coupled to the bottom side 128 of the base 124. Afterwards, any carrier strips or residual fragments left over from the stamping and forming processes are trimmed from the connector module 102. The lead frame 110 includes multiple signal contacts 172 (shown in FIG. 3) that are interconnected during the stamping and forming process to retain a set arrangement and spacing between the signal contacts 172 prior to coupling the lead frame 110 to the base 124. As a result, a following assembly step is to mechanically separate the signal contacts 172 of the lead frame 110 from each other to electrically isolate each of the individual signal contacts 172. In an embodiment, each of the signal contacts 172 are individually coupled to the base 124, so the signal contacts 172 do not disassociate from the lead frame 110 upon separating the signal contacts 172 from each other. The cover 122 is coupled to the base 124 at some point during the assembly process. In addition, the insulation pad 170 may be coupled to the bottom side 168 of the lead frame 110 during assembly. Alternatively, the insulation pad 170 may be placed on the circuit board 104 and the assembled connector module 102 placed over the insulation pad 170 as the connector module 102 is mounted to the circuit board 104.

In an embodiment, the non-conductive layer 164 of the base 124 is a powder coating layer. For example, the non-conductive layer 164 may be a polymer, such as a thermoplastic or thermoset polymer, that is ground into a dry powder. The dry powder does not include a liquid carrier, unlike wet paint and other traditional liquid coatings. To apply the powder to the conductive metal layer 154 of the base 124, the powder may be sprayed on the metal layer 154 or suspended in a fixed-volume fluidized bed and the metal layer 154 immersed in the fluidized bed. The metal layer 154 may be heated so the powder particles stick and melt to the surface. Optionally, an electric charge may be applied to the metal layer 154 and/or the powder which electrostatically attracts the powder to the metal layer 154. After coating, the base 124 may be cured under heat such that the powder forms a contiguous film.

In another embodiment, the non-conductive layer 164 of the base 124 is an electrostatic coating layer. The non-conductive layer 164 may be a polymer that is either in a powder or a liquid state. Typically an electrostatic charge is applied to both the metal layer 154 of the base 124 and the coating material as the metal layer 154 is sprayed with the coating material or dipped into the coating material. Ionic bonds hold the coating material to the metal layer 154 which forms a contiguous film. After applying the non-conductive layer 164, the base 124 may be rinsed off to remove residual coating material. Optionally, the base 124 may also be baked to cure the non-conductive layer 164. In other embodiments, the non-conductive layer 164 may be applied to the conductive layer 154 of the base 124 via traditional wet painting methods including dipping or spraying. The base 124 may be heated or at least allowed to dry (for example, the carrier fluid allowed to evaporate) prior to installing the base 124 in the connector module 102.

Figure 3:
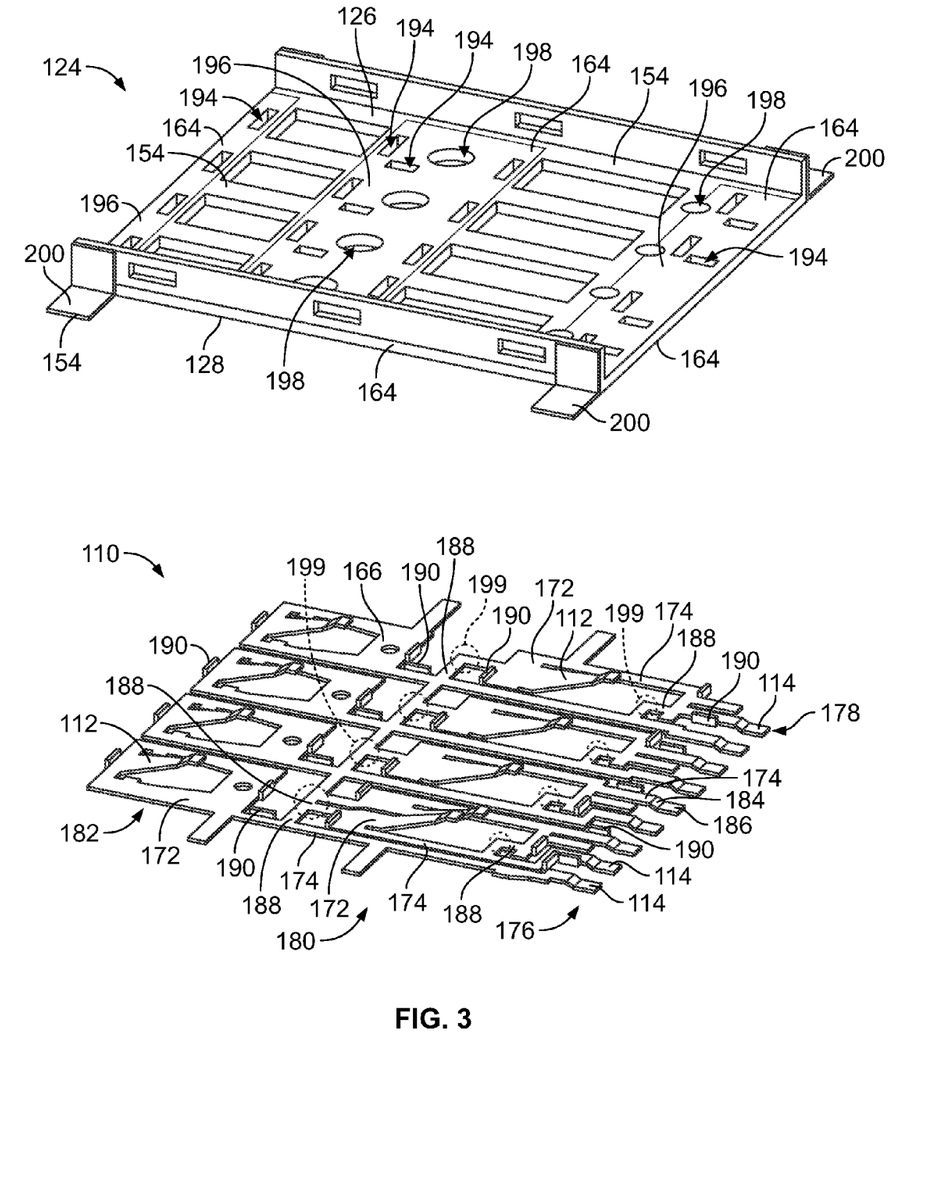
FIG. 3 is a perspective view of a base and a lead frame of the connector module according to an embodiment.

FIG. 3 is a perspective view of the base 124 and the lead frame 110 of the connector module 102 (shown in FIG. 1) according to an embodiment. The lead frame 110 includes multiple signal contacts 172. Each signal contact 172 has one contact beam 112, one mounting contact 114, and an intermediate segment 174 that extends between and connects the contact beam 112 and the mounting contact 114. The lead frame 110 shown in FIG. 3 has nine signal contacts 172, although other embodiments may include more or less than nine signal contacts 172. In the illustrated embodiment, the mounting contacts 114 are arranged in a row 176 at a mounting end 178 of the lead frame 110. The contact beams 112 are arranged in two rows of different distances from the row 176 of mounting contacts 114, including a proximal row 180 and a distal row 182. The proximal row 180 is between the distal row 182 and the row 176 of mounting contacts 114. The rows 176, 180, 182 optionally may be parallel to each other. The intermediate segments 174 of the signal contacts 172 that include contact beams 112 in the distal row 182 are longer than the intermediate segments 174 of the signal contacts 172 that have contact beams 112 in the proximal row 180 because the contact beams 112 in the distal row 182 are further from the mounting contacts 114. In other embodiments, the contact beams 112 and the mounting contacts 114 may have other arrangements. For example, the mounting contacts 114 may align in multiple rows at different ends of the lead frame 110.

The mounting contacts 114 may be jogged out of plane with the lead frame 110. For example, the mounting contacts 114 may include an angled transition segment 184 between the intermediate segment 174 and an end segment 186 of the mounting contact 114. The end segment 186 is configured to engage the circuit board 104 (shown in FIG. 1). The transition segment 184 extends at least partially downward away from the base 124 and towards the circuit board 104. As a result, the end segment 186 is offset from the intermediate segment 174 at a different relative distance from the circuit board 104 (and from the base 124). The transition segment 184 is configured to extend across a thickness of the insulation pad 170 (shown in FIG. 2) or any other component between the lead frame 110 and the circuit board 104 to allow the end segment 186 to mount to the circuit board 104.

Prior to completing assembly of the connector module 102 (shown in FIG. 1), the signal contacts 172 of the lead frame 110 may be held together by linking segments 188. The linking segments 188 in the illustrated embodiment are located between the proximal and distal rows 180, 182 of the contact beams 112 and between the proximal row 180 and the row 176 of mounting contacts 114. In addition to mechanically coupling the signal contacts 172, the linking segments 188 also electrically connect the signal contacts 172. In applications, the signal contacts 172 are used to convey different electrical signals, and thus need to be electrically isolated from each other. The linking segments 188 are configured to be fragmented during assembly of the connector module 102 to mechanically and electrically isolate the individual signal contacts 172.

In an embodiment, the lead frame 110 includes multiple locking tabs 190 that extend upward towards the base 124 from the top side 166 of the lead frame 110. The locking tabs 190 are each configured to extend through or around the base 124 and engage the top side 126 to couple the lead frame 110 to the base 124 during assembly of the connector module 102 (shown in FIG. 1). The locking tabs 190 are integral to the lead frame 110. The locking tabs 190 may be mechanically staked or folded over to engage the top side 126 of the base 124 and lock the lead frame 110 to the base 124. Alternatively, the locking tabs 190 may be deflectable and spring-biased such that the locking tabs 190 deflect around the base 124 until the locking tabs 190 move beyond the base 124 and the deflecting force is removed, at which point the tabs 190 snap into engagement with the top side 126 of the base 124. For example, the locking tabs 190 may be deflectable clips, such that the tabs 190 are U-shaped with a cantilevered end (not shown) or the like. The locking tabs 190 may be located at various positions along the top side 166 of the lead frame 110. For example, some locking tabs 190 may be located proximate to the contact beams 112 and other locking tabs 190 may be proximate to the mounting contacts 114. In an embodiment, each signal contact 172 has at least one locking tab 190 to individually couple the respective signal contact 172 to the base 124. In the illustrated embodiment, each signal contact 172 includes plural locking tabs 190 at spaced apart locations along a length of the signal contact 172 to provide multiple points of engagement with the base 124.

The base 124 includes multiple locking apertures 194 that extend through the base 124 between the top and bottom sides 126, 128. The locking apertures 194 are configured to receive the locking tabs 190 of the lead frame 110 to couple the lead frame 110 to the base 124. The locking apertures 194 are sized and shaped to accommodate the locking tabs 190 while also allowing the locking tabs 190 to engage the top side 126 of the base 124 surrounding the apertures 194. As shown in the illustrated embodiment, the locking apertures 194 are spaced apart at various defined locations along the base 124 such that the apertures 194 align with corresponding locking tabs 190 when the lead frame 110 is aligned with the base 124. The non-conductive layer 164 of the base 124 may cover the conductive layer 154 at least around the locking apertures 194. For example, the non-conductive layer 164 may cover at least part of the top side 126 of the base 124. Therefore, the locking tabs 190 contact the non-conductive layer 164 of the base 124 instead of the conductive layer 154 to keep the base 124 electrically isolated from the lead frame 110 and avoid short circuits. In the illustrated embodiment, the non-conductive layer 164 covers the conductive layer 154 along the top side 126 of the base 124 in three coated sections 196. All of the locking apertures 194 are contained within the three coated sections 196. Alternatively, the non-conductive layer 164 may cover different areas of the top side 126 than the illustrated embodiment, such as the entire top side 126.

The base 124 optionally defines punch holes 198 that extend through the base 124 between the top and bottom sides 126, 128. The punch holes 198 align with the linking segments 188 of the lead frame 110 when the lead frame 110 is aligned with the base 124. Phantom punch holes 199 are shown on the lead frame 110 to indicate the general areas of the lead frame 110 that align with the punch holes 198 of the base 124. The punch holes 198 are configured to provide access to the linking segments 188 to support the fragmenting of the linking segments 188 after the lead frame 110 is coupled to the base 124. For example, the punch holes 198 may guide a punch tool (not shown) or another tool to the linking segments 188. The punch tool fragments (for example, cuts, melts, or otherwise breaks) the linking segments 188 to mechanically separate and electrically isolate the individual signal contacts 172 from each other.

The base 124 may include at least one lug 200 that is configured to be mounted to the circuit board 104 (shown in FIG. 1) for structural support. The lugs 200 may be configured to be soldered, through-hole mounted, mechanically fastened, or otherwise secured to the circuit board 104. The base 124 in the illustrated embodiment has four lugs 200 that are each located proximate to a corner of the base 124, although only three are visible. By mounting the base 124 to the circuit board 104 directly, the mounting contacts 114 of the lead frame 110 do not provide the only retention of the connector module 102 (shown in FIG. 1) to the circuit board 104. For example, the at least one lug 200 allows the base 124 to absorb forces exerted on the connector module 102 when loading and unloading the circuit card 106 (shown in FIG. 1) into the connector module 102. The at least one lug 200 may be formed of the conductive layer 154 of the base 124 and not covered by the non-conductive layer 164 such that the lug 200 is conductive. The at least one lug 200 provides an electrical current path between the base 124 and the circuit board 104. Since the base 124 may be electrically connected to the cover 122 (shown in FIG. 1), the lug 200 provides an electrical current path between the entire housing 108 (shown in FIG. 1) and the circuit board 104. The electrical current path may be used for grounding. Optionally, the cover 122 includes mounting lugs 138 (shown in FIG. 1) that mount to the circuit board 104 instead of or in addition to the base 124 having the lugs 200.

Figure 4:
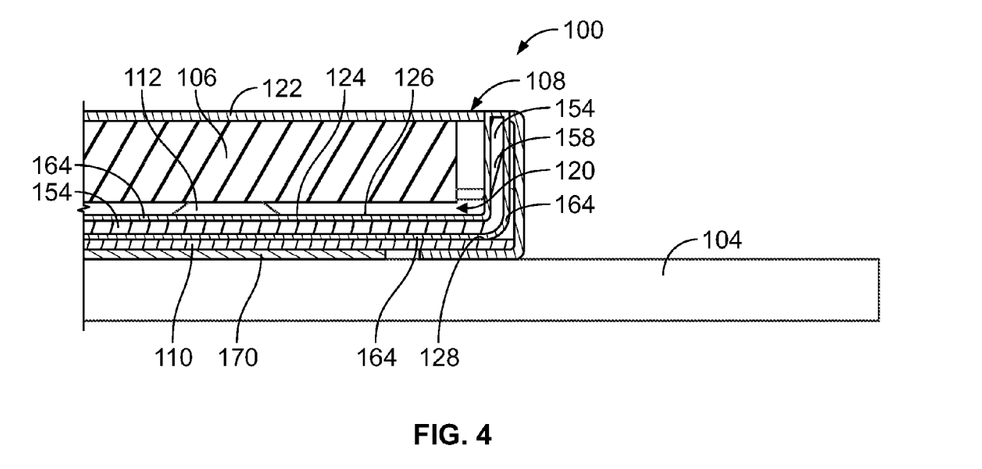
FIG. 4 is a cross-sectional view of a portion of the electrical system according to an embodiment.

FIG. 4 is a cross-sectional view of a portion of the electrical system 100 according to an embodiment. The circuit card 106 is shown within the cavity 120 of the housing 108 between the cover 122 and the base 124. The lead frame 110 is coupled to the bottom side 128 of the base 124 via locking tabs 190 (shown in FIG. 3). A contact beam 112 of the lead frame 110 protrudes through the base 124 and engages the circuit card 106. The insulation pad 170 is disposed between the lead frame 110 and the circuit board 104.

As shown in FIG. 4, the conductive layer 154 of the base 124 is covered by the non-conductive layer 164. The non-conductive layer 164 covers both the top side 126 and the bottom side 128 of the base 124, as well as both sides of the side wall 158. As described above with reference to FIG. 2, the non-conductive layer 164 may be a powder coating layer, an electrostatic coating layer, or another type of coating layer. The conductive lead frame 110 is electrically isolated from the conductive layer 154 of the base 124 by the non-conductive layer 164.

Figure 5:
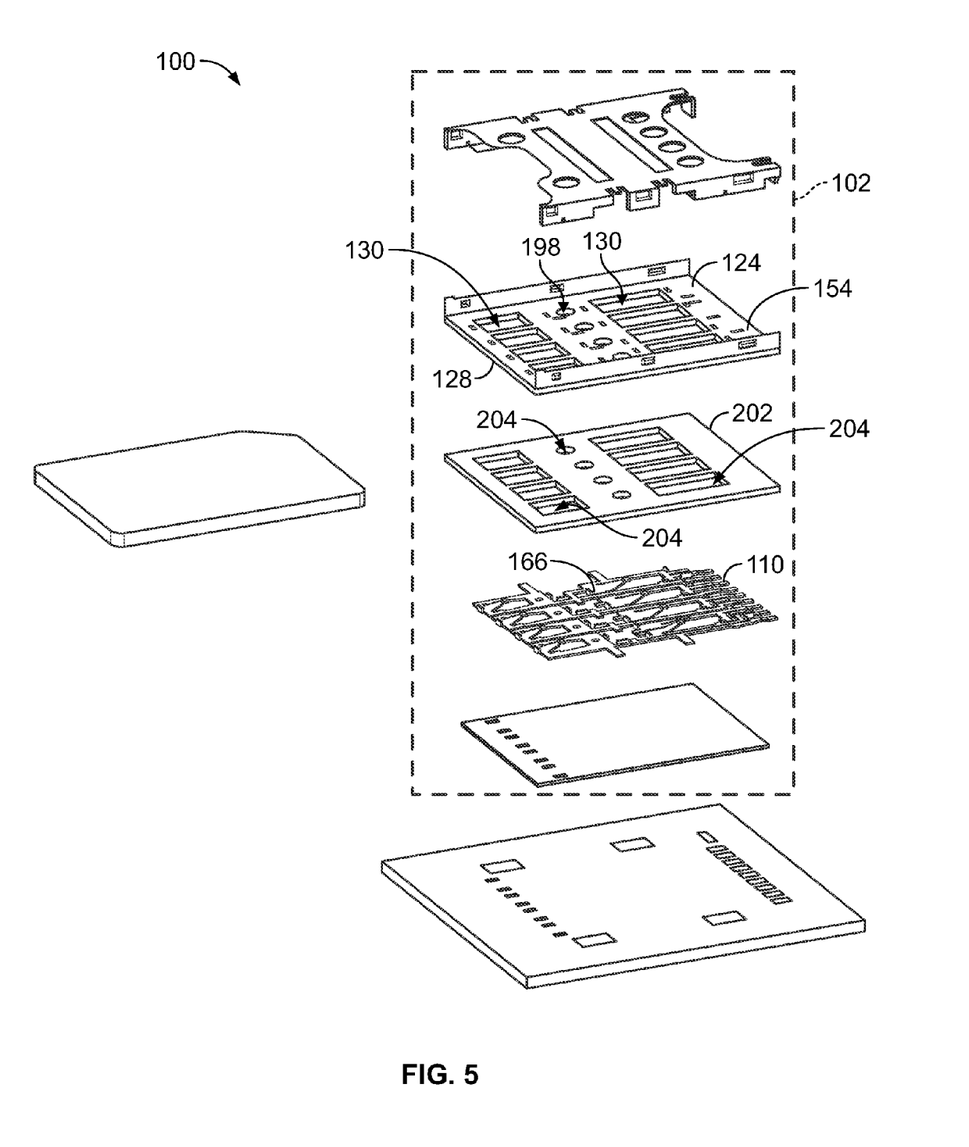
FIG. 5 is a perspective view of the electrical system showing an exploded connector module according to another embodiment.

FIG. 5 is a perspective view of the electrical system 100 showing an exploded connector module 102 according to another embodiment. The non-conductive layer 164 (shown in FIG. 2) of the base 124 is an adhesive layer 202 configured to be disposed on the bottom side 128 of the base 124. The adhesive layer 202 is not a powder coating layer, an electrostatic coating layer, or another coating layer. The adhesive layer 202 may be a type of tape, such as double-sided tape, or another adhesive material. The adhesive layer 202 is arranged in a web that extends around at least some of the windows 130 of the base 124 without covering the windows 130. For example, the adhesive layer 202 defines openings 204 that align with the windows 130 and the punch holes 198 of the base 124. Alternatively, the adhesive layer 202 may be arranged in multiple separate strips instead of a single connected web. For example, the strips may be disposed between the windows 130.

The adhesive layer 202 is disposed between the base 124 and the lead frame 110. For example, the adhesive layer 202 secures to the bottom side 128 of the base 124 and the top side 166 of the lead frame 110. The adhesive layer 202 couples the lead frame 110 to the base 124 due to the adhesive properties of the adhesive layer. The lead frame 110 in the illustrated embodiment does not include locking tabs 190 (shown in FIG. 4) because the adhesive layer 202 functions to couple the lead frame 110 to the base 124.

The adhesive layer 202 is composed of a non-conductive material, such as plastic or other polymers. The adhesive layer 202 is an electrical insulator. In an embodiment, the adhesive layer 202 secures directly to the conductive layer 154 of the base 124. The adhesive layer 202 electrically isolates the conductive layer 154 from the conductive lead frame 110. Since the adhesive layer 202 is the non-conductive layer that provides electrical isolation between conductive components of the base 124 and the lead frame 110, the conductive layer 154 of the base 124 need not be coated by a powder coating layer, an electrostatic coating layer, or the like. In the illustrated embodiment, the base 124 may be composed only of the conductive layer 154.

Figure 6:
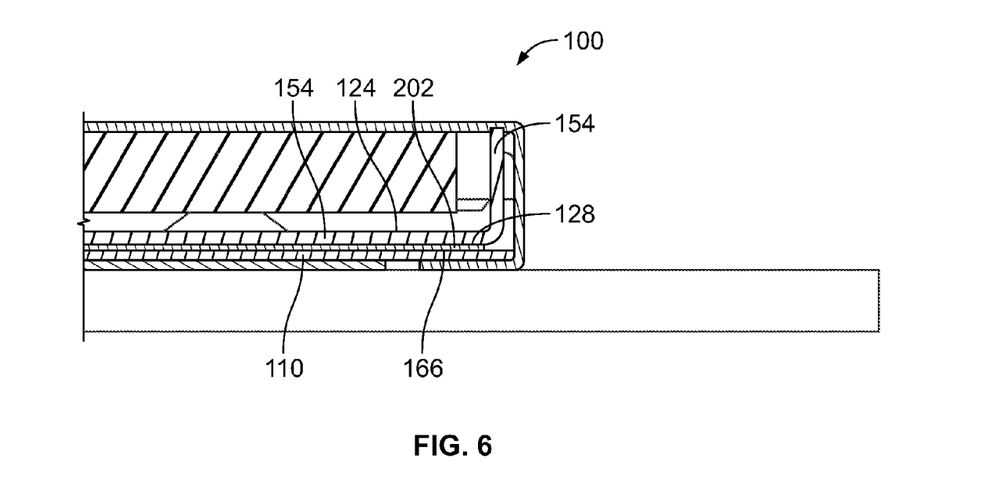
FIG. 6 a cross-sectional view of a portion of the electrical system according to the embodiment shown in FIG. 5.

FIG. 6 is a cross-sectional view of a portion of the electrical system 100 according to the embodiment shown in FIG. 5. The electrical system 100 shown in FIG. 6 is similar to the electrical system 100 shown in FIG. 4, except for a few distinctions. For example, in FIG. 6, the non-conductive layer 164 (shown in FIG. 2) that at least partially covers the conductive layer 154 of the base 124 is the adhesive layer 202. The adhesive layer 202 extends between and secures to the bottom side 128 of the base 124 and the top side 166 of the lead frame 110. The base 124 includes the conductive layer 154 only, and is not covered by a powder coating layer, an electrostatic coating layer, or another non-conductive coating layer besides the adhesive layer 202.

In an alternative embodiment, the base 124 shown in FIGS. 5 and 6 further includes a powder coating layer, electrostatic coating layer, or another non-conductive coating layer that covers at least part of the conductive layer 154. For example, the coating layer may extend between the conductive layer 154 and the adhesive layer 202 to provide additional electrical insulation between the conductive layer 154 and the lead frame 110. In another alternative embodiment, the lead frame 110 further includes locking tabs, such as the locking tabs 190 shown in FIG. 3. The lead frame 110 therefore may be coupled to the base 124 by the adhesive layer 202 and the locking tabs to provide stronger coupling between the lead frame 110 and the base 124.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. A connector module comprising:
a housing having a front end and including a cover and a base, the cover being coupled to the base to define a cavity therebetween, the front end defining an opening to the cavity, the cavity configured to receive a circuit card that is loaded through the opening in a loading direction relative to the housing, the housing having a top side and a bottom side, the top side facing the cover and defining part of the cavity, the base defining multiple windows that extend through the base between the top and bottom sides, the base including a conductive layer that is at least partially covered by a non-conductive layer; and
a conductive lead frame coupled to the bottom side of the base, the lead frame including multiple contact beams that extend into the cavity through the windows of the base, the lead frame being electrically isolated from the conductive layer of the base by the non-conductive layer of the base, the lead frame further including multiple mounting contacts configured to be mounted to conductive components of a circuit board.

2. The connector module of claim 1, wherein the lead frame includes multiple locking tabs that are configured to extend at least one of through or around the base and engage the top side of the base to couple the lead frame to the base.

3. The connector module of claim 1, wherein the non-conductive layer of the base is an adhesive layer disposed on the bottom side of the base, the adhesive layer securing to a top side of the lead frame to couple the lead frame to the base.

4. The connector module of claim 1, wherein the non-conductive layer of the base is a powder coating layer.

5. The connector module of claim 1, wherein the non-conductive layer of the base is an electrostatic coating layer.

6. The connector module of claim 1, wherein the lead frame includes multiple signal contacts, each signal contact having one of the contact beams, a corresponding one of the mounting contacts, and an intermediate segment that connects the contact beam to the mounting contact, the signal contacts of the lead frame held together by linking segments, the linking segments configured to be fragmented to mechanically and electrically isolate the signal contacts from each other.

7. The connector module of claim 1, further comprising an insulation pad disposed between the conductive lead frame and the circuit board, the mounting contacts of the lead frame being jogged out of plane with the lead frame to extend across a thickness of the insulation pad to allow the mounting contacts to engage the circuit board.

8. The connector module of claim 1, wherein the base includes at least one lug that extends from the base and is configured to be mounted to the circuit board, the at least one lug being formed of the conductive layer of the base and not covered by the non-conductive layer, the at least one lug providing an electrical current path between the housing and the circuit board.

9. The connector module of claim 1, wherein the cover is formed of a conductive metal, the cover engaging side walls of the base to couple the cover to the base, the side walls of the base composed of the conductive layer and not covered by the non-conductive layer such that the cover electrically connects to the base.

10. A connector module comprising:
a housing including a base that defines a slot, the slot configured to receive a circuit card therein, the base having a top side and a bottom side, the top side defining at least part of the slot, the base having multiple windows that extend through the base between the top and bottom sides, the base including a conductive metal layer that is at least partially covered by a non-conductive powder coating layer; and
a conductive lead frame coupled to the bottom side of the base, the lead frame including multiple contact beams that extend through the windows of the base into the slot, the lead frame being electrically isolated from the metal layer of the base by the powder coating layer of the base, the lead frame further including multiple mounting contacts configured to be mounted to conductive components of a circuit board.

11. The connector module of claim 10, wherein the base includes a floor and two side walls that extend from the top side of the floor along edges of the floor, the slot defined above the top side of the floor between the two side walls.

12. The connector module of claim 10, wherein the bottom side of the base includes the metal layer covered by the powder coating layer, and the top side of the base includes the metal layer not covered by the powder coating layer.

13. The connector module of claim 10, wherein the base includes multiple locking apertures that extend through the base between the top and bottom sides, the powder coating layer covering the metal layer at the top side of the base at least around the locking apertures, wherein the lead frame has multiple locking tabs that are configured to extend through the locking apertures to engage the powder coating layer at the top side of the base to couple the lead frame to the base.

14. The connector module of claim 10, further comprising an insulation pad disposed between the conductive lead frame and the circuit board, the mounting contacts of the lead frame being jogged out of plane with the lead frame to extend across a thickness of the insulation pad to allow the mounting contacts to engage the circuit board.

15. A connector module comprising:
a housing including a base that defines a slot, the slot configured to receive a circuit card therein, the base having a top side and a bottom side, the top side defining at least part of the slot, the base having multiple windows that extend through the base between the top and bottom sides, the base including a conductive metal layer, the base further including a non-conductive adhesive layer disposed on the bottom side of the base; and
a conductive lead frame secured to the adhesive layer such that the adhesive layer is between the metal layer of the base and the lead frame, the lead frame including multiple contact beams that extend through the windows of the base into the slot, the lead frame being electrically isolated from the metal layer of the base by the adhesive layer, the lead frame further including multiple mounting contacts configured to be mounted to conductive components of a circuit board.

16. The connector module of claim 15, wherein the adhesive layer of the base is double-sided tape.

17. The connector module of claim 15, wherein the adhesive layer is arranged in a web that extends around at least some of the windows of the base without covering the windows.

18. The connector module of claim 15, wherein the base includes multiple punch holes that extend through the base between the top and the bottom sides, the lead frame including multiple signal contacts that each include one of the contact beams and a corresponding one of the mounting contacts, the signal contacts of the lead frame held together by linking segments that align with the punch holes, the punch holes configured to guide a punch tool that fragments the linking segments to mechanically and electrically isolate the signal contacts from each other.

19. The connector module of claim 15, wherein the base further includes a non-conductive powder coating layer at least partially covering the metal layer, the powder coating layer extending between the metal layer and the adhesive layer.

20. The connector module of claim 1, wherein each contact beam of the lead frame extends through a different window of the multiple windows of the base.

* * * * *